United States Patent [19]

Schreck et al.

[11] Patent Number: 5,100,981
[45] Date of Patent: Mar. 31, 1992

[54] PROCESS FOR THE PREPARATION OF A POLYPROPYLENE

[75] Inventors: Michael Schreck, Frankfurt am Main; Volker Dolle, Kelkheim, both of Fed. Rep. of Germany

[73] Assignee: Hoechst Aktiengesellschaft, Frankfurt am Main, Fed. Rep. of Germany

[21] Appl. No.: 362,846

[22] Filed: Jun. 7, 1989

[30] Foreign Application Priority Data

Jun. 9, 1988 [DE] Fed. Rep. of Germany ....... 3819577

[51] Int. Cl.$^5$ .................. C08F 4/654; C08F 4/651; C08F 10/06
[52] U.S. Cl. .................. 526/125; 502/125; 526/351
[58] Field of Search ......................... 526/125

[56] References Cited

U.S. PATENT DOCUMENTS

| 4,472,524 | 9/1984 | Albizzati | 526/125 |
| 4,529,716 | 7/1985 | Banzi et al. | 526/125 |
| 4,841,003 | 6/1989 | Kashiwa et al. | 526/125 |
| 4,843,132 | 6/1989 | Werner et al. | 526/125 |

FOREIGN PATENT DOCUMENTS

| 0045977 | 2/1982 | European Pat. Off. |
| 0147053 | 7/1985 | European Pat. Off. |
| 0155716 | 9/1985 | European Pat. Off. |
| 0250229 | 12/1987 | European Pat. Off. |
| 3241999 | 5/1983 | Fed. Rep. of Germany |
| 2111066 | 6/1983 | United Kingdom |

Primary Examiner—Edward J. Smith

[57] ABSTRACT

In the process according to the invention for the preparation of a polypropylene, a catalyst system is used which is based on the product of the reaction of a magnesium halide with an electron donor and a tetravalent titanium compound, a halogen-free organoaluminum compound and two different organosilicon compounds as stereo-regulator. Propylene homopolymers and copolymers having a very narrow molecular weight distribution and high isotacticity are obtained in high yields. The polymers are suitable, in particular, for injection molding.

8 Claims, No Drawings

PROCESS FOR THE PREPARATION OF A POLYPROPYLENE

DESCRIPTION

The present invention relates to a process for the preparation of a polypropylene having a narrow molecular weight distribution and good processing properties.

A catalyst system using which polypropylene is obtained with good isotacticity and high yield is known (cf. German Offenlegungsschrift 3,241,999). The catalyst system comprises the following components (A), (B) and (C):

(A) a solid component, containing magnesium, titanium, halogen and an ester, the component being obtained by bringing a solution of (i) a magnesium compound into contact with (ii) a liquid titanium compound in the presence of (D) at least one electron donor and, during or after the formation of the solid product (A), into contact with (E) an ester, (B) an organometallic compound of a metal of groups I to III of the Periodic Table, and (C) an organosilicon compound containing an Si-O-C bond or an Si-N-C bond.

Due to its molecular weight distribution, however, the polymer obtained using this catalyst s rheological properties which are unfavorable for a number of processing processes, for example injection molding, and which must be corrected by a work-up step by such as, for example, thermal degradation, following the polymerization.

Furthermore, a catalyst system is known which is obtained by reacting anhydrous magnesium chloride with an ester, ether or alkoxysilane compound, a titanium halide and an organoaluminum compound (cf. JP 58-65,709). Although the molecular weight distribution of the polypropylene obtained by means of this catalyst is narrow, the isotacticity is, however, still not adequate.

Another catalyst prepared from compounds of magnesium, titanium, silicon and aluminum gives polyolefins having a narrow molecular weight distribution and good isotacticity (cf. JP 62-179,511).

Furthermore, a catalyst system is known which contains a solid comprising magnesium chloride, titanium tetrachloride and an electron donor, a trialkylaluminum as cocatalyst and, in addition, two different stereoregulators (cf. EP-A 155,716). The catalyst system has acceptable polymerization activity, but the stereospecificity is not satisfactory.

The object was therefore to find a catalyst system which gives a high yield of polypropylene having a narrow molecular weight distribution and high isotacticity.

It has been found that a catalyst system based on a magnesium halide, an electron donor, a titanium compound, a trialkylaluminum and two different organosilicon compounds as stereoregulators is capable of achieving the object.

The invention thus relates to a process for the preparation of a polypropylene by homopolymerization of propylene or copolymerization of propylene with ethylene or a 1-olefin having 4 to 10 carbon atoms, in suspension or in the gas phase, at a temperature of from 40° to 100° C. and at a pressure of from 1 to 49 bar, in the presence of a catalyst comprising a transition-metal component (component A), obtained by reacting a magnesium halide first with at least one electron donor and then with a tetravalent titanium compound of the formula $TiX_m(OR^1)_{4-m}$ in which $R^1$ is an alkyl radical having 2 to 10 carbon atoms, X is a halogen atom and m is a number from 0 to 4, in the presence of an ester of an aromatic carboxylic acid, and comprising a halogen-free organoaluminum compound (component B) and an organosilicon compound as stereoregulator (component C), which comprises carrying out the polymerization in the presence of a catalyst which contains two different organosilicon compounds having Si-O-C bonds as stereoregulator (components C and D).

For the preparation of component A, an anhydrous magnesium halide, such as magnesium chloride or magnesium bromide, preferably magnesium chloride, is employed.

The product of the reaction of the magnesium halide with the electron donor is prepared in a manner known per se in the presence of an inert solvent, for example by heating the magnesium halide in a solution of the co-reactants or suspending the Mg halide in the liquid coreactant.

The molar ratio between the magnesium halide employed and the electron donor compound is greater than 2:1. A molar ratio of from 3 to 15:1 is preferred, and a molar ratio of from 4.5 to 8:1 is particularly preferred.

The electron donor compounds used are $C_1$–$C_{20}$-monocarboxylic acid esters, $C_1$–$C_{20}$-aliphatic carboxylic acids, $C_4$–$C_{20}$-carboxylic anhydrides, $C_3$–$C_{20}$-ketones, $C_2$–$C_{16}$-aliphatic ethers, $C_3$–$C_{20}$-aliphatic carbonates, alcohols containing a $C_3$–$C_{20}$-alkoxy group, alcohols containing a $C_3$–$C_{20}$-aryloxy group, organosilicon compounds having an Si-O-C bond, in which the organic group has 1 to 10 carbon atoms, and organophosphorus compounds having a P-O-C bond, in which the organic group has 1 to 10 carbon atoms.

Examples of suitable electron donors are methylpentanol, 2-ethylhexanol, 2-ethylhexanoic acid and phthalic anhydride.

A reactor fitted with stirrer, heating device and protective-gas blanket ($N_2$, Ar) is used for the reaction. The reaction medium initially introduced is expediently the dispersant also used in the polymerization. Suitable dispersants are aliphatic or cycloaliphatic hydrocarbons, such as butane, pentane, hexane, heptane, cyclohexane, methylcyclohexane, isooctane and aromatic hydrocarbons, such as benzene, toluene and xylene; it is also possible to use petroleum fractions and hydrogenated diesel oil fractions which have been carefully freed from oxygen, sulfur compounds and moisture. The dispersant must not contain any compounds having double bonds. The reaction is carried out at a temperature of from 0° to 200° C., preferably 30° to 150° C.

Depending on the reactivity of the reactants, the reaction time is 0.5 to 5 hours, preferably 1 to 3 hours. The solution obtained is then cooled.

The complex obtained in this manner is reacted immediately with a tetravalent titanium compound of the formula $TiX_m(OR^1)_{4-m}$ in which $R^1$ is an alkyl radical having 2 to 10 carbon atoms, X is a halogen atom, preferably chlorine, and m is an integer from 0 to 4, but preferably 2 or 4. It is possible to employ a mixture of several of these compounds.

Examples of preferred compounds are $TiCl_4$, $TiCl_3(OEt)$, $TiCl_3(O\text{-}iPr)$, $TiCl_2(OEt)_2$, $TiCl_2(O\text{-}iPr)_2$, $TiCl_2(O\text{-}CH_2C_6H_5)_2$, $TiCl(O\text{-}iBu)_3$, $Ti(OEt)_4$, $Ti(O\text{-}Pr)_4$ or $Ti(O\text{-}iPr)_4$.

Very particularly preferred compounds are TiCl$_4$, TiCl$_2$(OEt)$_2$ and Ti(OEt)$_4$, or a mixture of these compounds.

In the reaction described above, the titanium compound is employed in an amount of from 0.1 to 2 moles, preferably 0.8 to 1.8 moles, based on one gram-atom of magnesium in the complex. The reaction temperature is 30° to 150° C., preferably 60° to 120° C., and the reaction time is 30 minutes up to several hours, preferably 1 to 5 hours.

The reaction is carried out in the presence of an ester of a polyhydroxyl compound, in particular an ester of a C$_6$–C$_{16}$-aromatic polyhydroxyl compound with a C$_1$–C$_{12}$-aliphatic carboxylic acid. Preferred compounds of this type are diesters of phthalic acid with a C$_1$–C$_{12}$-aliphatic or aromatic alcohol, for example diethyl phthalate or diisobutyl phthalate.

The catalyst component A prepared in this manner is finally freed from soluble impurities, such as metal or halogen compounds, by repeated washing with an inert hydrocarbon at a temperature of from 0° to 100° C., preferably 10° to 50° C.

Suitable halogen-free organoaluminum compounds (component B) are, in particular, branched, unsubstituted alkylaluminum compounds of the formula AlR$_3$ where R denotes an alkyl radical having 1 to 10 carbon atoms, such as, for example, trimethylaluminum, triethylaluminum, triisobutylaluminum and tridiisobutylaluminum. Further suitable compounds are the products of the reaction of triisobutylaluminum or diisobutylaluminum hydride and isoprene, which are commercially available under the name isoprenylaluminum. Triethylaluminum and triisobutylaluminum are particularly suitable.

The catalyst components C and D are organosilicon compounds of the formula R$_n^2$Si(OR$^3$)$_{4-n}$, in which R$^2$ denotes a C$_1$–C$_{10}$-alkyl group, C$_5$–C$_{12}$-cycloalkyl group, C$_6$–C$_{20}$-aryl group, C$_1$–C$_{10}$-alkenyl group, C$_1$–C$_{10}$-haloalkyl group or C$_1$–C$_{10}$-amino group, R$^3$ denotes a C$_1$–C$_{10}$-alkyl group, C$_5$–C$_{12}$-cycloalkyl group, C$_6$–C$_{20}$-aryl group, C$_1$–C$_{10}$-alkenyl group or C$_2$–C$_{16}$-alkoxyalkyl group, and n denotes an integer, and the R$^2$ groups or (4−n) OR$^3$ groups may be identical or different.

Examples of components (C) and (D) are organosilicon compounds, such as trimethylmethoxysilane, trimethylethoxysilane, dimethyldimethoxysilane, dimethyldiethoxysilane, diphenyldimethoxysilane, methylphenyldimethoxysilane, diphenyldiethoxysilane, ethyltrimethoxysilane, methyltrimethoxysilane, vinyltrimethoxysilane, phenyltri-methoxysilane, γ-chloropropyltrimethoxysilane, methyltriethoxysilane, ethyltriethoxysila butytriethoxysilane, phenyltriethoxysilane, γ-aminopropyltriethoxysilane, chloropropyltriethoxysilane, cyclohexylmethyldimethoxysilane, cyclohexylmethyldiethoxysilane, di-n-octyldimethoxysilane, di-n-octyldiethoxysilane, i-octyltrimethoxysilane, i-octyltriethoxysilane, methylphenyldiethoxysilane, dibutyldimethoxysilane, dibutyldiethoxysilane, di-i-butyldimethoxysilane, di-i-butyldiethoxysilane, di-t-butyldimethoxysilane, di-t-butyldiethoxysilane, t-butyltrimethoxysilane, t-butyltriethoxysilane, di-p-toluyldimethoxysilane, di-p-toluyldiethoxysilane, dicyclohexyldimethoxysilane, dicyclohexyldiethoxysilane, ethyltriisopropoxysilane, vinyltributoxysilane, ethyl silicate, butyl silicate, trimethylphenoxysilane, methyltriallyloxysilane, vinyltris(β-methoxyethoxy)silane, vinyltriacetoxysilane, dimethyltetraethoxydisilane and phenyldiethoxydiethylaminosilane.

Of these, methyltrimethoxysilane, phenyltrimethoxysilane, methyltriethoxysilane, ethyltriethoxysilane, phenylmethyldiethoxysilane, cyclohexylmethyldimethoxysilane, cyclohexylmethyldiethoxysilane, vinyltriethoxysilane, phenyltriethoxysilane, vinyltributoxysilane, ethyl silicate, diphenyldimethoxysilane, diphenyldiethoxysilane and methylphenyldimethoxysilane are preferred.

Diphenyldimethoxysilane, diphenyldiethoxysilane, cyclohexylmethyldimethoxysilane, cyclohexylmethyldiethoxysilane, phenyltrimethoxysilane and phenyltriethoxysilane are particularly preferred.

Component D is always different from component C.

Component A is employed for the polymerization of propylene in the form of a suspension in an inert hydrocarbon or alternatively in dry form after removal of the suspension agent. The copolymerization of propylene with ethylene and/or a 1-olefin having 4 to 10 carbon atoms and one or more double bonds, for example 1-butene, isobutene, 1-hexene or 1,3-butadiene, is also possible.

The process according to the invention can be carried out in one or several steps in the gas phase, in the liquid monomer or in a solvent which is inert and liquid at the reaction temperature under atmospheric pressure, it being possible to carry out the reaction either continuously or batchwise. The polymerization is preferably carried out in the liquid monomer.

The catalyst concentration is selected at a level which is customary for a propylene polymerization. The concentration of component A is therefore 0.001 to 1 mmol/dm$^3$, based on titanium, preferably 0.001 to 0.1 mmol/dm$^3$.

Component B is initially introduced in a concentration of from 0.001 to 5 mmol/dm$^3$, preferably 0.1 to 5 mmol/dm$^3$, component C in a concentration of from 0.003 to 2 mmol/dm$^3$, preferably 0.03 to 1.2 mmol/dm$^3$, and component D in a concentration of from 0.003 to 2 mmol/dm:, preferably 0.03 to 1.2 mmol/dm$^3$. The molar ratio between components C and D can vary here from 1:99 to 99:1. A ratio of from 20:80 to 80:20 is preferred. The polymerization is carried out by pumping liquid propylene, a suspension of the solid catalyst component in an inert suspension agent, and the other liquid catalyst components into a suitable reaction vessel. This reaction vessel can be an autoclave, a customary reactor or a tubular reactor in coil form, adequate mixing being ensured as usual by built-in stirrers or circulation pumps.

The heat of reaction is dissipated by jacket cooling, by internal cooling built into the vessels or by evaporative cooling.

The liquid propylene itself, which serves both as the monomer and as the suspension agent, can contain varying amounts of inert, low-boiling, dissolved components, such as, for example, propane or nitrogen, but these have no effect on the products produced in this process.

A reaction temperature of from 40° to 100° C., preferably a reaction temperature of from 50° to 75° C., is maintained. The pressure is 1 to 49 bar, preferably 20 to 35 bar.

The establishment of the molecular weight desired for the polymer is effected by adding hydrogen to the batch. The amount added is adjusted so that the product produced has a melt flow index MFI 230/5 of from 0.05 to 5000 g/10 min.

After the polymerization has been carried out, the polymer produced is separated off from the suspension agent and the other soluble reaction products. This can be effected by a filtration, decantation or centrifugation step in pressure-tight units which are suitable for this purpose, for example in pressure filters, sedimentation towers, centrifuges or decanters. In order to complete the removal of the soluble reaction products, separation can be preceded by a washing step in which the suspension is subject, for example, to a countercurrent wash with fresh liquid propylene. The washing and separation can also be carried out in a single unit which carries out both tasks, such as, for example, a washing and sedimentation tower operating on the countercurrent principle. In this case, a greatly thickened suspension of the polymer powder in substantially pure suspension agent is withdrawn at the lower end of the tower.

As a consequence of the very high activity of the catalyst employed according to the invention, it is generally not necessary to remove catalyst residues. If, however, an extremely low content of catalyst residues should be desired, a vessel in which improved removal of catalyst residues is effected at a temperature of from 50° to 80° C., preferably 60° to 70° C., by adding hydrogen-acidic compounds which decompose the organoaluminum compounds and simultaneously complex the magnesium halide present in the polymer powder, can be introduced between the second polymerization step and the separation step. Examples of suitable compounds of this type are higher aliphatic carboxylic acids, such as 2-ethylhexanoic acid.

The propylene-moist polymer powder obtained after the liquid components have been removed is now dried completely.

The process according to the invention thus makes it possible to prepare propylene homopolymers and copolymers with a high catalyst yield and high isotacticity, it being possible to control the molecular weight distribution of the polymer through a suitable choice of catalyst components C and D and the concentration ratio thereof.

The properties of the polymers prepared in accordance with the examples below were determined individually by the following methods:

The melt flow index MFI 230/5 was measured in accordance with DIN 53 735 and is given in g/10 min.

The molecular weight distribution $M_w/M_n$ was determined by gel permeation chromatography at 150° C. using 1,2-dichlorobenzene as the solvent.

EXAMPLE

Preparation of a solid titanium catalyst component 9.52 g (100 mmol) of anhydrous magnesium chloride, 50 cm³ of decane and 46.8 cm³ (300 mmol) of 2-ethylhexyl alcohol were reacted for 2 hours at 130° C., during which time the magnesium chloride dissolved. 2.22 g (15.0 mmol) of phthalic anhydride were added to the solution. The mixture was stirred for a further 1 hour at 130° C. until the phthalic anhydride had dissolved. The solution obtained was cooled to room temperature and added dropwise over the course of 1 hour to 400 cm³ (3.6 mol) of titanium tetrachloride at −20° C., after which the mixture was heated to 110° C. over the course of 4 hours. When the temperature of 110° C. had been reached, 5.36 cm³ (25.0 mmol) of diisobutyl phthalate were added. The mixture was kept at this temperature with stirring for a further 2 hours. The batch was then filtered while hot, and the solid component was re-suspended in 400 cm³ of titanium tetrachloride and reacted for 2 hours at 100° C. The solid was then collected by hot filtration and washed with decane and hexane at 100° C. until free titanium compound could no longer be detected in the washing solvents.

The solid catalyst component A obtained in this way was stored in the form of a suspension in hexane. Some of the suspension was dried in order to investigate the composition of the catalyst. Analysis gave 2.5% by weight of titanium, 56.4% by weight of chlorine, 17.5% by weight of magnesium and 21.0% by weight of diisobutyl phthalate.

Polymerization

In a reactor with a capacity of 70 dm³ fitted with an impeller stirrer, 15 dm³ (s t.p.) of hydrogen and 40 dm³ of liquid propylene were initially introduced, and 200 mmol of triethylaluminum, 20 mmol of phenyltriethoxy-silane 20 mmol of cyclohexylmethyldimethoxysilane and 2.83 cm³ of the above catalyst suspension (100.04 mmol of Ti) were metered in successively. The reactor contents were then heated to 70° C. and kept at this temperature for 60 minutes. After the mixture had been cooled and excess monomer had been evaporated, 2.42 kg of polypropylene were obtained. The polymer had an MFI 230/5 of 19.5 g/10 min, a xylene-soluble content of 1.8% by weight and an $M_w/M_n$ value of 4.7.

Comparative Example A

The example was repeated, but 37 dm³ (s.t.p.) of $H_2$ were initially introduced and the two silanes were replaced by 40 mmol of phenyltriethoxysilane. 1.28 kg of polymer having an MFI 230/5 of 13.5 g/10 min, a soluble content of 2.7% by weight and an $M_w/M_n$ value of 7.2 were obtained.

Comparative Example B

Comparative Example A was repeated, but the silane used was replaced by 40 mmol of cyclohexylmethyldimethoxysilane. 1.66 kg of polymer having an MFI 230/5 of 17.4 g/10 min, a soluble content of 2.4% by weight and an $M_w/M_n$ value of 7.3 were obtained.

We claim:

1. A process for the preparation of a polypropylene by homopolymerization of propylene or copolymerization of porpylene with ethylene or a 1-olefin having 4 to 10 carbon atoms, in suspension or in the gas phase, at a temperature of from 40° to 100° C. and at a pressure of from 1 to 49 bar, in the presence of a catalyst comprising a. a transition-metal component (component A) obtained by reacting a magnesium halide first with at least one electron donor and then with a tetravalent titanium compound of the formula $TiX_m(OR^1)_{4-m}$ in which $R^1$ is an alkyl radical having 2 to 10 carbon atoms, X is a halogen atom and m is a number from 0 to 4, in the presence of an ester of an aromatic carboxylic acid, and b. a halogen-free organoaluminum compound (component B) and c. an organosilicon compound as stereoregulator, which comprises carrying out the polymerization in the presence of a catalyst which contains, as stereoregulators, two different organosilicon compounds, component C and component D, component C being cyclohexylmethyldimethoxysilane, and component D being phenyltriethoxysilane.

2. The process as claimed in claim 1 wherein said magnesium halide and said electron donor compound is employed at a molar ratio greater than 2:1.

3. The process as claimed in claim 1 wherein said magnesium halide and said electron donor compound is employed at a molar ratio ranging from 3:1 to 15:1.

4. The process as claimed in claim 1 wherein said magnesium halide and said electron compound is employed at a molar ratio ranging from 4.5:1 to 8:1.

5. The process as claimed in claim 1, wherein X is chlorine.

6. The process as claimed in claim 1, wherein m is 2 or 4.

7. The process as claimed in claim 1, wherein said homo- or copolymerization occurs at a temperature ranging from 50° to 70° C.

8. The process as claimed in claim 1, wherein said homo- or copolymerization occurs at a pressure ranging from 20 to 35 bar.

* * * * *